March 31, 1925.　　　　　　　　　　　　　　　　1,531,758
A. ROSENTHAL
CORN HUSKER
Filed May 17, 1923　　　　5 Sheets-Sheet 3
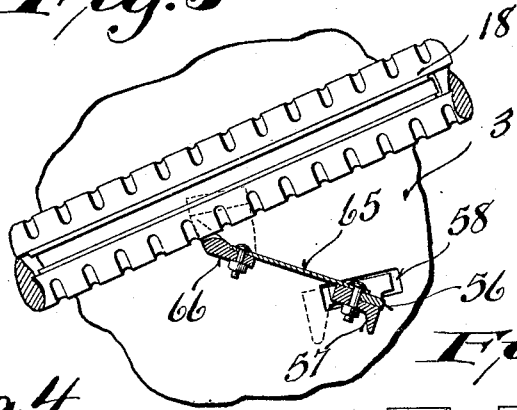
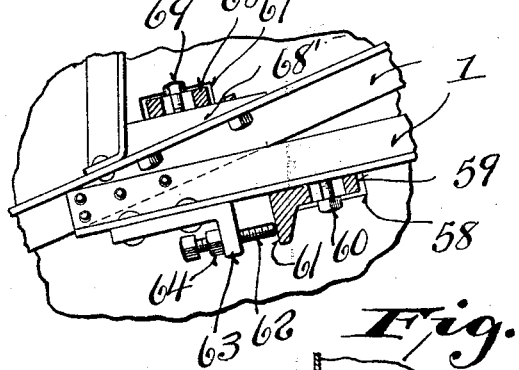
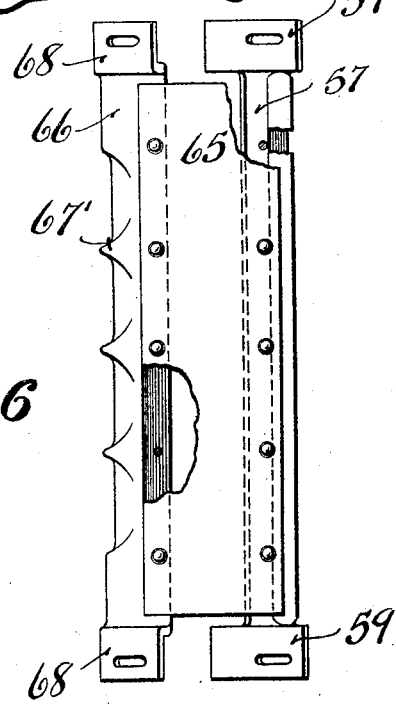
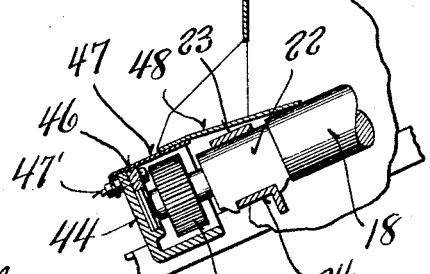
Inventor:
August Rosenthal
By
Attorneys March 31, 1925.  1,531,758

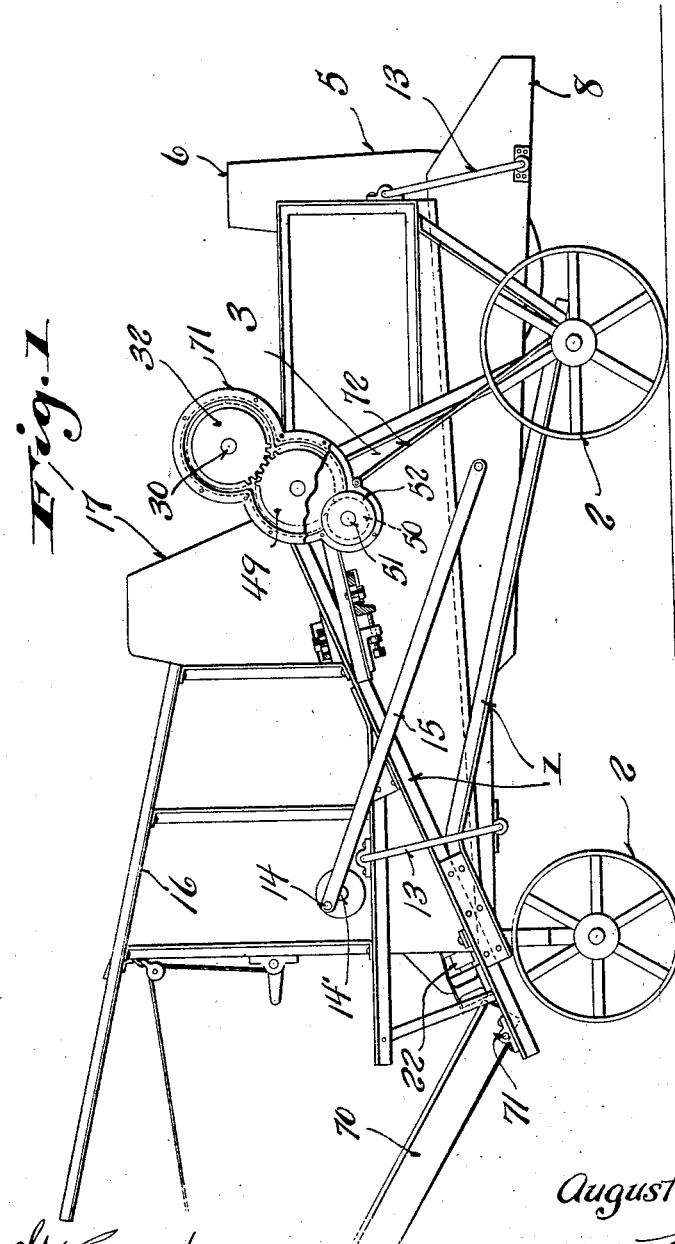

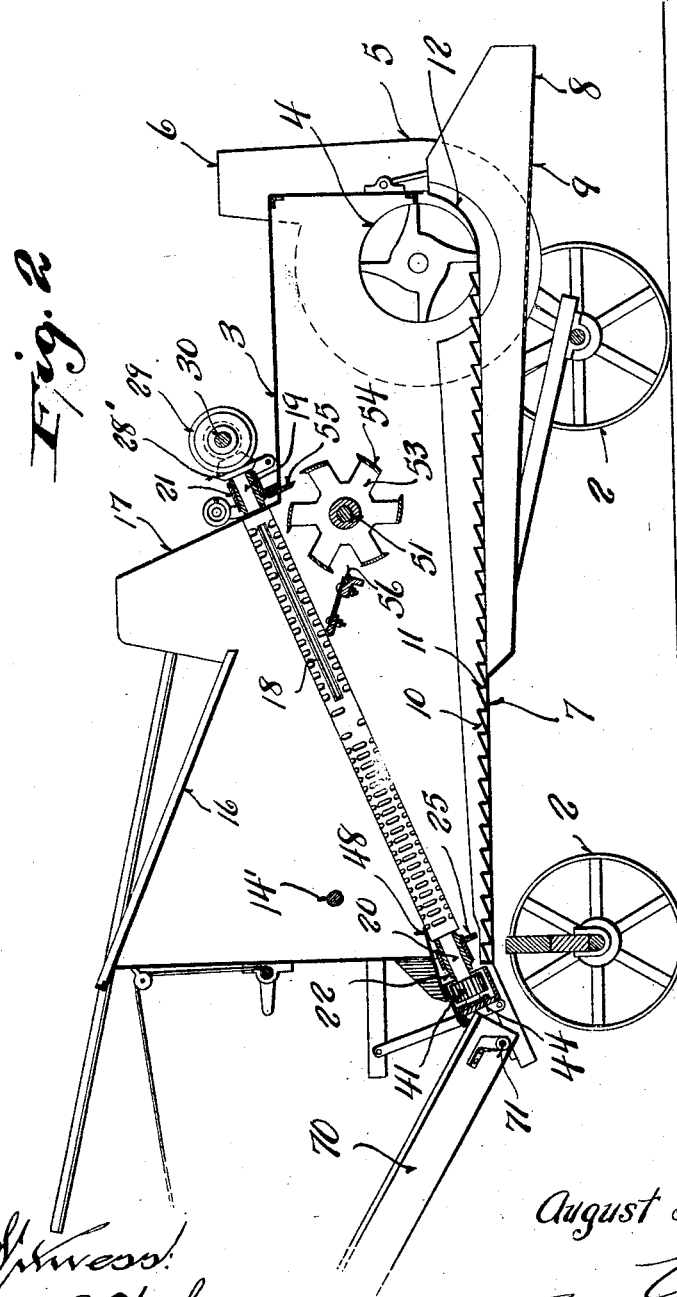

A. ROSENTHAL

CORN HUSKER

Filed May 17, 1923   5 Sheets-Sheet 4

Witness
R. E. Weber

Inventor
August Rosenthal
By
Attorneys

March 31, 1925. 1,531,758
A. ROSENTHAL
CORN HUSKER
Filed May 17, 1923 5 Sheets-Sheet 5

Inventor:
August Rosenthal

Patented Mar. 31, 1925.

1,531,758

UNITED STATES PATENT OFFICE.

AUGUST ROSENTHAL, OF WEST ALLIS, WISCONSIN, ASSIGNOR TO ROSENTHAL MANUFACTURING CO., OF WEST ALLIS, WISCONSIN.

CORN HUSKER.

Application filed May 17, 1923. Serial No. 639,502.

*To all whom it may concern:*

Be it known that I, AUGUST ROSENTHAL, a citizen of the United States, and resident of West Allis, in the county of Milwaukee and State of Wisconsin, have invented certain new and useful Improvements in Corn Huskers, and do hereby declare that the following is a full, clear, and exact description thereof.

This invention relates to corn huskers and is particularly directed to a combined corn husker, ensilage cutter, and silo filler.

This invention is an improvement over that disclosed in my Patent Number 1,228,971 of June 5th, 1917, for corn husker and ensilage cutters and silo fillers, and has, therefore, the same general objects as such former invention.

In machines as heretofore constructed, difficulty has been experienced due to the bending of the material by the cutter and the consequent slanting cut—necessarily resulting in an unnecessary load upon the machine and frequently resulting in a gradual clogging of the rapidly rotating cutter. Further, the cutter or shredder head was inaccessible and any damage to the cutter necessitated an elaborate dismantling operation before the simplest repairs to such cutter could be made;—frequently, in actual practice, a half day was lost due to so small a repair as the interchange of knives. Frequently, in former machines of this type, material would be passed by the rolls over the cutter and towards the blower, which, even if not damaging the blower, resulted in an unchopped portion of the ensilage.

These machines are provided with slanting rolls whose lower ends were carried in bearings and were provided with intermeshing gears which frequently became clogged and soon showed signs of excessive wear in addition to the wear upon the supporting bearings. No provision was made for taking up the wear of the bearings and consequently the rollers soon became slightly misplaced, resulting in inefficient operation of the machine.

This invention is designed to overcome the above noted defects, and objects of this invention are, therefore, to provide a machine for husking corn, cutting ensilage, and filling silos which is highly efficient, which ensures the cutting of all portions of the ensilage without crowding or binding of the cutter head, which has provision for independently taking up wear in the roller supporting bearings, which protects the mechanism for such rollers, and which is so constructed that the intermeshing gears of the rollers run in oil.

Further objects are to provide a machine in which the cutter head is readily accessible for repair, adjustment or sharpening, in which the shear bar and apron are adjustable from the outside of the machine, and in which the terminal or front end of the feeding means for the ensilage is confined to thereby prevent the feeding of the ensilage past the blower.

An embodiment of the invention is shown in the accompanying drawings, in which:—

Figure 1 is a side elevation of the machine.

Figure 2 is a transverse sectional view through the machine.

Figure 3 is a fragmentary enlarged detail of one of the stripper rolls, showing the relative arrangement of the apron and shear bar.

Figure 4 is a detail of the frame work, showing in section the external terminals of the support for the shear bar and apron, together with their adjustable mechanism.

Figure 5 is a plan view of the shear bar and apron and the transverse supports.

Figure 6 is a detail of the lower end of one of the stripping rolls.

Figure 7:
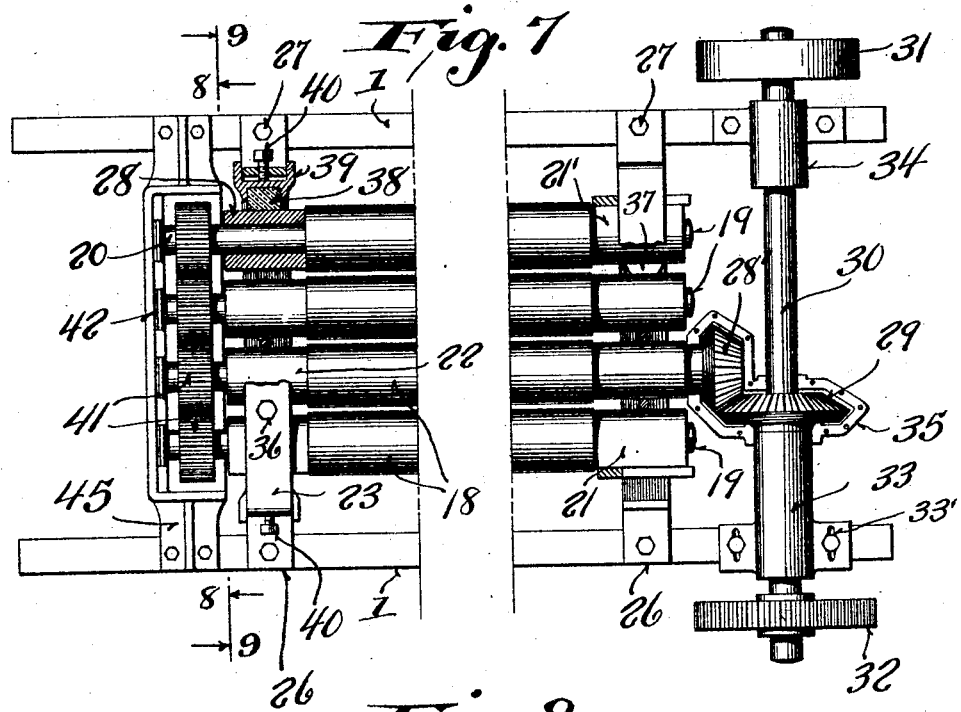
Figure 7 is a plan view of the stripping rolls and the associated mechanism, such view being broken away and being partly in section.

Referring more particularly to the drawings, it will be seen that the machine comprises a frame work 1 supported upon suitable wheels 2 and carrying a housing, or casing 3. The housing is provided adjacent its forward end with an opening 4 communicating with the interior of the blower casing 5 and constituting an inlet for such blower—the blower being provided with an outlet 6 and adapted to be connected to suitable delivery pipe through which the ensilage may be blown to the silo.

The bottom portion of the housing is closed by means of a reciprocatory floor, or coarse sieve 7 from which is suspended a frame work including a discharge spout, or trough 8, having a plurality of perforations 9 adapted to sift dust and trash therethrough. This bottom portion 7 or sieve, is provided with a plurality of up-struck protuberances having a slanting top surface 10 and an abrupt forward face which is apertured, as indicated at 11, so that corn accidentally shelled during the operation of the machine, will pass through the apertures 11 and be discharged before the blower opening 4 is reached. The forward end of this apertured floor 7 is provided with an up-turned portion 12 adjacent the forward side of the blower inlet opening 4, so as to confine the cut material or ensilage and ensure its passing into the inlet opening and prevent its being fed beyond the blower. The entire casing and floor may be suspended, as indicated in Figure 1, by means of links 13 and a crank 14 connected in any manner with a suitable source of power and is adapted to oscillate the floor and chute 8 by means of a pitman 15.

The rear upper side of the casing, or housing 3 is provided with a delivery trough, or chute 16, adapted to receive the corn stalks with the unhusked corn attached thereto and to guide such material downwardly into the housing. An upwardly and rearwardly extending plate 17 is provided upon the housing so as to ensure the passage of the material into the housing at the exact point desired.

Figure 8:
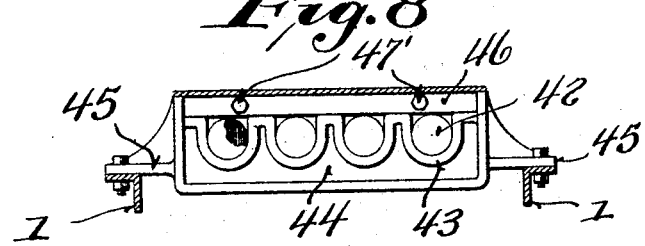
Figure 8 is a sectional view taken on the line 8—8 of Figure 7.
Figure 9:
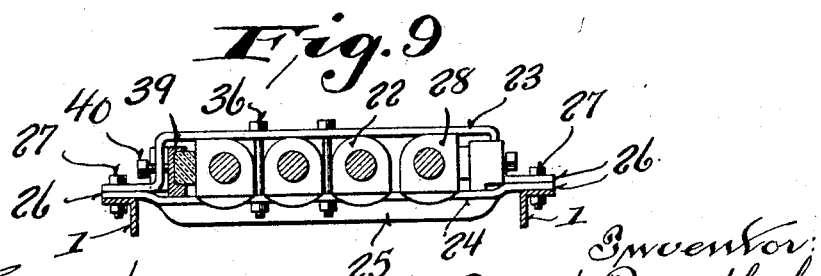
Figure 9 is a sectional view taken on the line 9—9 of Figure 7.

A plurality of parallel, downwardly slanting stripper rolls 18 are provided and are equipped with upper and lower trunnions 19 and 20 respectively, which are carried in upper and lower bearings 21 and 22. These bearings are conveniently carried by means of a transverse member formed of an upper and lower strap 23 and 24 (see Figures 7 and 9). The lower strap is preferably provided with a strengthening rib 25. Both straps are provided with outwardly extending ears 26, through which attaching bolts 27 are passed to firmly secure such members to the side slanting bars of the angle iron frame, indicated generally at 1 throughout the drawings. The rolls are conveniently driven by means of a pair of beveled gears 28 and 29, as indicated in Figure 7, from a transverse shaft 30, one end of which is provided with a pulley 31 and the other with a gear 32 whose purpose will hereinafter be described. This transverse shaft is carried by suitable bearings 33 and 34 attached to the frame of the machine, one of the bearings 33 for instance, being elongated and carrying at its outer end a two-part gear casing 35 adapted to house the gears 28' and 29. The gear 28' is preferably secured to one of the upper trunnions 19, such trunnion being accordingly elongated. Both bearings are provided with attaching ears and the elongated bearing 33 is provided with attaching ears provided with elongated slots 33' through which the attaching bolts pass. When wear occurs in the gears 28' and 29 this bearing may be slipped inwardly to compensate for such wear—the elongated slots 33' permitting this adjustment. The bearings 22 are carried, as stated, between the members 23 and 24. The upper and lower bearings for the trunnions of the roll provided with the beveled gear 28', are positively positioned by means of bolts 36 passed through the upper and lower members 23 and 24, as may be seen from Figures 7 and 9, to thereby positively position this roll. One of the outermost bearings, such as indicated at 21', is preferably provided with a lug 37 which spaces it from the adjacent bearing. The lower ends of the rolls are permitted a slight adjustment, pressure blocks 38 being forced against the outermost of the bearings 28, such outermost bearings being provided with correspondingly flattened faces. These bearing blocks 38 are conveniently carried in adjusting slides 39 whose positions are controlled by means of the bolts 40. The lower trunnions 20 are elongated and are provided with intermeshing gears 41. These gears may be adjustably held in meshing relation by means of the blocks 38, slides 39 and adjusting screws, or bolts 40, previously described. The means for maintaining the correct longitudinal positioning of the stripper rolls 18 and forming in effect thrust bearings, may comprise a plurality of hardened disks 42 carried in open topped pockets 43 formed in the transverse wall 44 of a supporting member. This member is provided with laterally extending ears 45 suitably webbed and bolted to the side frames 1 as indicated in Figures 7 and 8. These hardened disks are adapted to contact with the rearmost face of the trunnions 20 and to therefore, correctly position such trunnions and form thrust bearings therefor. They are prevented from coming out of the open topped pockets by means of a transverse bar 46 secured across such open mouths, as indicated in Figure 8. It is intended that the transverse member be provided with a bottom and with side walls, as indicated in Figures 7 and 8. A removable cover 47 is provided for this member, as indicated in Figure 6, and is held thereon by means of bolts 47', such bolts serving also to retain the bar 46. It is intended that this transverse member shall form in effect a housing for the intermeshing gears 41 and shall retain oil, or grease, so that the gears may be constantly lubricated and may be protected from dust and dirt. It is to be understood that the bearings 21 and 22 shall be held in any suitable manner in engagement with the members 23 and 24 as, for example, by means of lugs formed upon such bearings as indicated in Figures 2, 6 and 9. A protecting sheath 48 is positioned over the bearing 22 (see Figure 6) and extends from the cover 47 to the stripper rolls 18, to provide a free passage for the shucked corn.

As may be seen from Figure 1, the gear 32 meshes with an idler gear 49 and such gear 49 in turn, meshes with a smaller gear 50 secured upon a transverse shaft 51, such shaft being provided, as indicated in Figure 1, with a driving pulley 52. The shaft 51 extends transversely through the housing and carries a cutter head 53 which includes a plurality of cutter knives 54. This cutter head, as may be seen from Figure 2, is mounted beneath the upper forward ends of the stripper rolls 18 and in close proximity thereto. It cooperates with the rolls to prevent the passage of material over the cutter head and to the blower. A downwardly projecting member 55 is provided to aid in securing this result. This cutter head cooperates with a cutter bar indicated generally at 56 in Figure 2 to sever the material pinched from the ears of corn and passed between the rolls.

It also, as will be seen from Figure 2, executes a direct cut upon the material projected towards the cutter head through said rolls and such cut is made closely adjacent the rolls. It will also be noted that the material will not be bent over by the cutter head and brought into contact with the shear bar, but that the material passed between the upper ends of the rolls will be severed directly adjacent such upper ends and that the material passed at a slightly greater distance down the rolls will be severed at the shear bar 56. In this manner, bending of the material by the cutter head and binding of the cutter head by clogging, or other means, is wholly prevented, such prevention being materially assisted by the auxiliary guard, as later explained.

The shear bar 56, as may be seen from Figures 2 and 3, consists of a removable hardened portion which cooperates with the knives 54. The shear bar 56 is carried by means of a transverse support 57 which projects through slots 58 formed in the housing 3 and terminates in apertured bearing feet 59 (see Figure 5). These bearing feet are clamped against the appropriate members of the frame 1, as may be seen in Figure 4, by means of bolts 60, such bolts passing through the apertures in said feet. It is to be noted from Figure 4 that the rear faces 61 of the bearing feet, with adjusting screws 62, pass through an upturned portion 63 of brackets riveted to the side frames and are held in position by means of lock nuts 64. The transverse support 57 also carries one end of an apron 65 whose other upper and rear end is carried by a corresponding transverse support 66 provided with upwardly projecting tapered portion 67' adapted to roughly fit between the stripper rolls (see Figures 3 and 5). This transverse support 66 projects through slots 67 formed in the housing 3 and terminates in apertured bearing feet 68, such feet resting upon the upper faces of tapered blocks 68' bolted to an appropriate portion of the frame 1 and presenting a face to such feet which causes the feet 68 to parallel the feet 59, as may be seen from Figure 4. Clamping screws, or bolts 69 are passed through the apertured feet 68 and clamp them in position.

It is to be noted that the shear bar and the associated apron may be adjusted by means external to the housing 3. In effecting this adjustment, it is merely necessary to loosen the screws 60 and 69 and to adjust the screws 62, thereafter locking the nuts 64 of such screws and again clamping the feet in position by means of the screws 60 and 69, thereby holding the transverse supporting members in their correct position and maintaining the adjustment of the shear bar and its associated apron.

It is, of course, to be understood that the blower, the shaft 30 and the crank 14 and shaft 51 may be connected by belts, if desired, or may be driven in any desired manner from any suitable source of power. For instance, the blower may be belted to the pulley 31 (see Figure 7) and the pulley 52 (see Figure 1) may be the power receiving pulley. If desired, the crank 14 (see Figure 1) may be carried upon a transversely extended shaft 14', which may be provided with a pulley (not shown) and suitably belted to the pulley 31.

Figure 10:
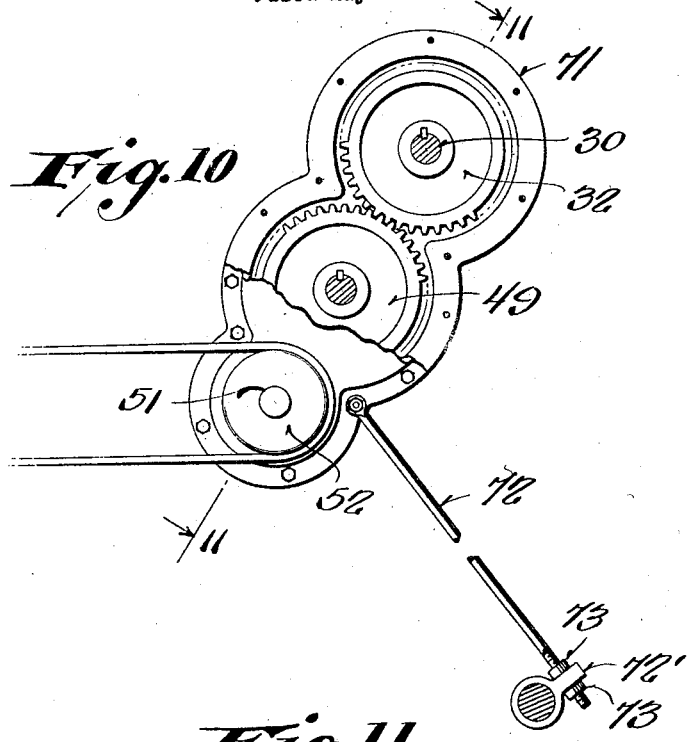
Figure 10 is a detailed side elevation with parts broken away and in section of the main gear housing and its bracing means.
Figure 11:
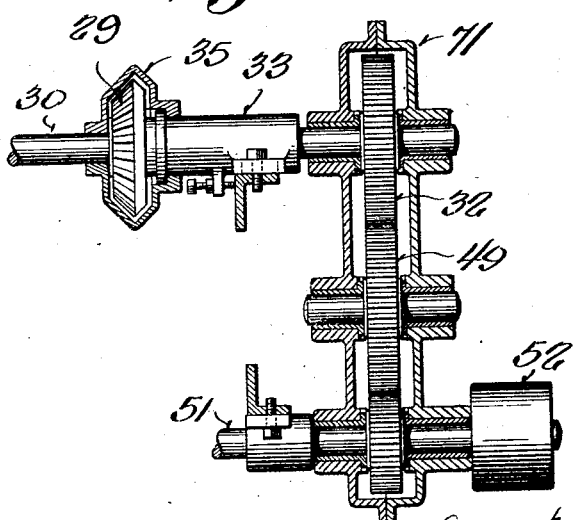
Figure 11 is a longitudinal section taken on the line 11—11 of Figure 10, the same illustrating a portion of the main frame exhausting mechanism.

In devices of this type, it is preferable to protect the driving portions of the apparatus as far as possible from the entry of grit and dust, and to provide for the ready oiling of the parts. For this reason, therefore, a casing 71 is provided for the gears 32, 49 and 50. In Figure 1 this casing is shown partly broken away to show the gears. The preferred manner of carrying this casing is to support it upon the shafts 30 and 51 and allow the casing to support the shaft for the idler gear 49. Obviously these gears may run in oil and the maximum smoothness of operation obtained. Inasmuch as the driving belt exerts considerable force upon the pulley 52, it is preferable to provide an adjustable brace 72 which joins the casing 71 with the rear axle, as shown in Figures 1 and 10, the brace 72 being threaded into a collar 72', carried in the rear axle, and locked by set nuts 73.

Briefly, the operation of the apparatus is as follows:

The corn stalks with the unshucked corn attached thereto are gradually fed along the trough 16 and on to the stripper rolls 18. The stalks will be snapped from the ears of corn, together with a portion of the husk and will be carried into contact with the rotating cutter head and there cut into a size suitable for ensilage and dropped upon the conveyor 10, such conveyor, in turn passing these cut stalks to the blower and any shelled corn being discharged through the oscillatory apertured conveyor 10. The ears of corn with a portion of the shucks thereon slide downwardly along the stripper rolls 18 and the husks are gradually pulled from the ears by the action of the roughened rolls 18 in a well known manner. The completely husked corn is discharged over the plate 48 and into any suitable conveyor, such as illustrated in Figures 1 and 2 and indicated by the reference character 70, such conveyor being conveniently pivotally carried by brackets 71 (see Figure 1) attached to a portion of the frame 1. It will thus be seen that a combined corn husker, ensilage cutter and silo filler has been provided in which bending of the material by the cutter head and clogging of the cutter head is wholly prevented.

It is to be noted that the extra guard 55 may take the form of a shear knife and cooperates with the cutter plates so that any material carried over by the cutter or inadvertently fed along the top of the cutter will be severed at this point. Also if for any reason material should collect beneath the cutter and be carried over thereby, such material will be immediately cut at this point and clogging of the machine prevented.

It will also be seen that means have been provided for protecting the meshing gears of the stripper rolls from dust and dirt and for permitting such rolls to run in grease, or other lubricant, said housing being readily removable in whole or in part, having no connection with the main frame, but being carried entirely by the shaft 51 and 30. It is also obvious that the housing 71, anchored at its upper end to the shaft, cooperates with the brace 72 to relieve strain upon the shaft 51 and its bearings, due to the fact that both the housing and brace are both obliquely and oppositely offset with relation to the line of belt drive, and anchored at approximately equidistant points from the shaft 51.

It will further be seen that means have been provided for taking up any wear which would throw the rolls 18 out of longitudinal adjustment. It, of course, is obvious that one or more plates or disks, may be inserted in the pockets adjacent the lower trunnions of such rolls.

A further feature to be noted is the ease with which the shear bar and the associated apron may be accurately adjusted externally of the housing 3 of the machine.

I claim:

In a machine of the class described, the combination of a plurality of parallel rolls arranged in a downwardly slanting manner and having upper and lower trunnions, said rolls being adapted to operate upon gritty and dusty material, bearings for said trunnions, a frame for supporting said bearings, driving means connected with the upper trunnion of one of said rolls, a plurality of intermeshing gears carried by the lower trunnions to cause simultaneous rotation of said rolls, and a transverse casing carried by said frame and housing said gears and having a removable portion, whereby said gears are rendered readily accessible and are adapted to operate in a lubricant with substantial protection from dust.

In testimony that I claim the foregoing I have hereunto set my hand at West Allis, in the county of Milwaukee and State of Wisconsin.

AUGUST ROSENTHAL.